United States Patent
Takahara

(10) Patent No.: US 9,813,201 B2
(45) Date of Patent: Nov. 7, 2017

(54) TRANSMISSION APPARATUS AND TRANSMISSION METHOD

(71) Applicant: FUJITSU LIMITED, Kawasaki-shi, Kanagawa (JP)

(72) Inventor: Tomoo Takahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/885,008

(22) Filed: Oct. 16, 2015

(65) Prior Publication Data

US 2016/0119090 A1 Apr. 28, 2016

(30) Foreign Application Priority Data

Oct. 28, 2014 (JP) .................. 2014-219747

(51) Int. Cl.
*H04B 10/04* (2006.01)
*H04L 5/00* (2006.01)
(Continued)

(52) U.S. Cl.
CPC ........... *H04L 5/001* (2013.01); *H04B 10/516* (2013.01); *H04B 10/564* (2013.01); *H04J 14/00* (2013.01); *H04L 5/006* (2013.01)

(58) Field of Classification Search
CPC .............. H04B 10/516; H04B 10/5161; H04B 10/564; H04B 10/503; H04B 10/25752;
(Continued)

(56) References Cited

U.S. PATENT DOCUMENTS

2014/0099114 A1 4/2014 Nishihara et al.
2014/0169425 A1 6/2014 Kolze et al.
(Continued)

FOREIGN PATENT DOCUMENTS

EP 2720395 A2 4/2014
JP 2004-112781 4/2004

OTHER PUBLICATIONS

P.S. Chow et al., "A Practical Discrete Multitone Transceiver Loading Algorithm for Data Transmission over Spectrally Shaped Channels," IEEE Transactions on Communications, vol. 43, No. 2/3/4, pp. 773-775, Feb. 1995.
(Continued)

*Primary Examiner* — Hanh Phan
(74) *Attorney, Agent, or Firm* — Staas & Halsey LLP

(57) ABSTRACT

A transmission apparatus includes: a first obtaining section configured to obtain a first transmission characteristic in communication of a multi-carrier signal through a transmission path between the transmission apparatus and a distant transmission apparatus; a second obtaining section configured to obtain a second transmission characteristic under a predetermined usage condition within a specified performance range of the transmission apparatus; a correcting section configured to correct the first transmission characteristic according to the second transmission characteristic; and a determining section configured to determine an amount of allocation for each subcarrier included in the multi-carrier signal, according to the first transmission characteristic that has been corrected by the correcting section.

17 Claims, 16 Drawing Sheets

(51) Int. Cl.
*H04B 10/516* (2013.01)
*H04B 10/564* (2013.01)
*H04J 14/00* (2006.01)

(58) Field of Classification Search
CPC .............. H04B 10/2575; H04J 14/0298; H04J 14/0226; H04J 14/0227; H04J 14/0239
USPC ......... 398/183, 188, 76, 202, 208, 209, 158, 398/159, 135, 136, 137, 138, 139, 115, 398/162, 79, 25, 26, 27, 33, 38, 192, 193, 398/194, 195, 197, 198
See application file for complete search history.

(56) References Cited

U.S. PATENT DOCUMENTS

2015/0256288 A1* 9/2015 Tanaka .................... H04L 1/004
 714/776
2015/0372762 A1* 12/2015 Zhang ................ H04B 10/5161
 398/26

OTHER PUBLICATIONS

Extended European Search Report dated Mar. 4, 2016 in European Application No. 15190797.9.
Chinese Office Action dated Jun. 15, 2017 in corresponding Chinese Patent Application No. 201510700679.X.

* cited by examiner

SNR CHARACTERISTIC

BIT ALLOCATION RESULT

POWER ALLOCATION RESULT

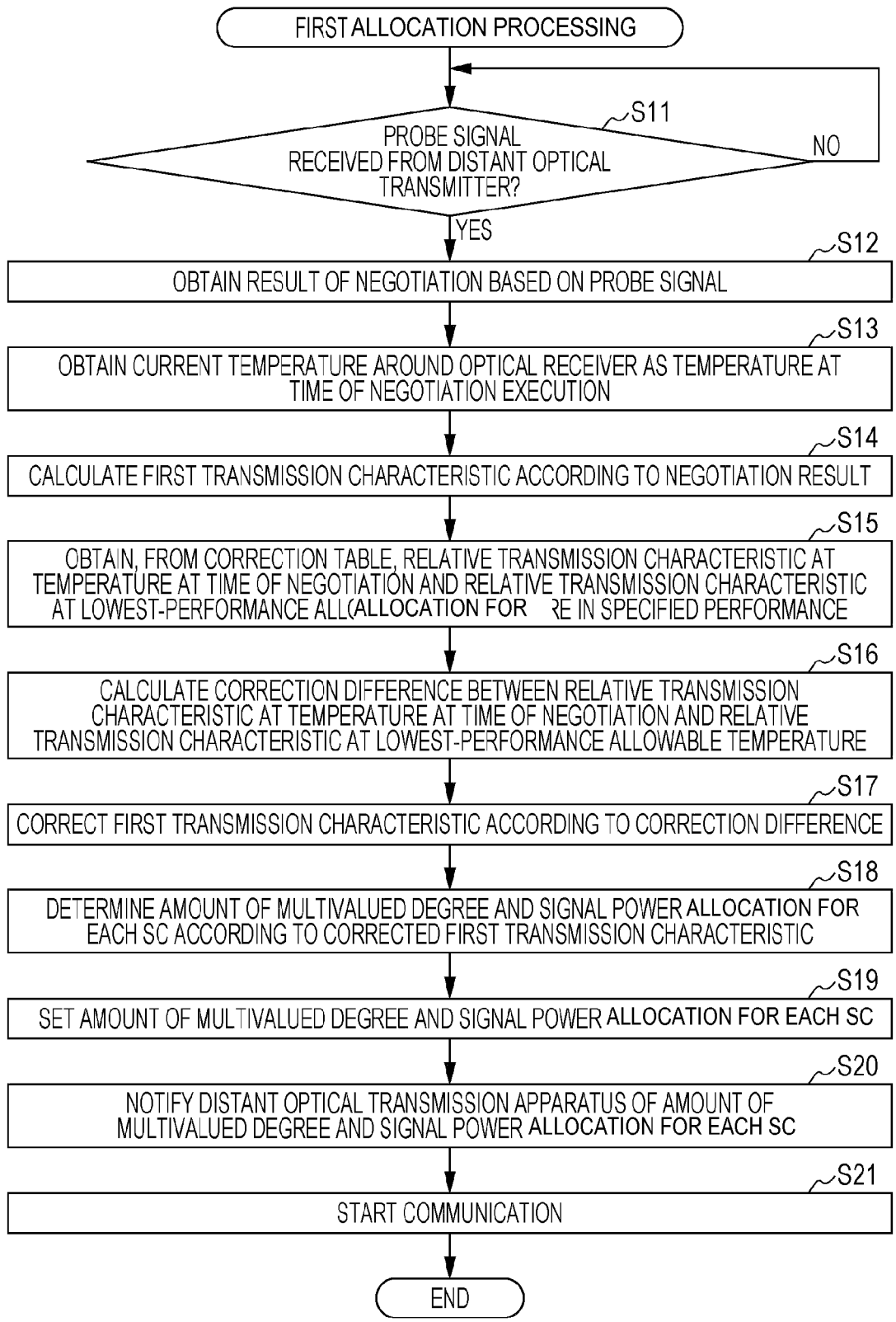

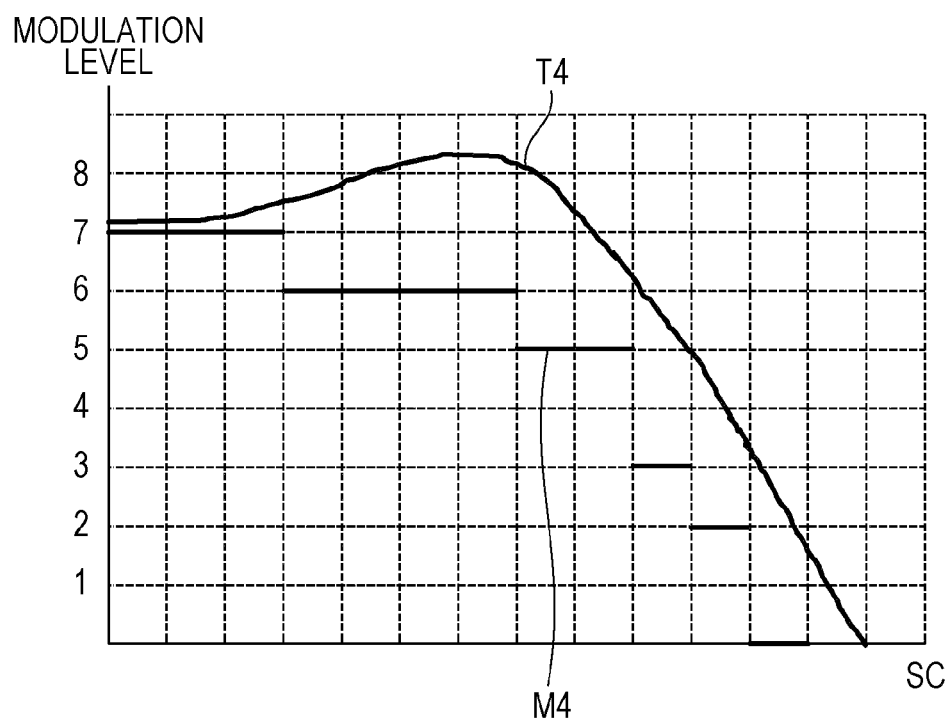

TRANSMISSION APPARATUS AND TRANSMISSION METHOD

CROSS-REFERENCE TO RELATED APPLICATION

This application is based upon and claims the benefit of priority of the prior Japanese Patent Application No. 2014-219747, filed on Oct. 28, 2014, the entire contents of which are incorporated herein by reference.

FIELD

The embodiments discussed herein are related to a transmission apparatus and a transmission method.

BACKGROUND

Recently, a transmission method is demanded by which a large amount of data is optically transmitted through an optical network. Multi-carrier modulation methods such as, for example, a discrete multi-tone (DMT) modulation method are known as transmission methods in which an optical network is used. The DMT modulation method is one of multi-carrier transmission technologies based on the orthogonal frequency division multiplexing (OFDM). In the DMT modulation method, data is allocated to a plurality of subcarriers (SCs) with different frequencies, after which multi-level modulation is performed on data allocated to each SC and the data is transmitted at high speed as a DMT signal.

An optical transmission apparatus in the DMT modulation method negotiates with a distant optical transmission apparatus with a probe signal at the time of, for example, a system startup. The optical transmission apparatus acquires a received characteristic according to a negotiation result, and sets the received characteristic as a transmission characteristic. According to the transmission characteristic setting, the optical transmission apparatus executes bit and power loading to determine the amount of modulation-level (number of bits) and signal power allocation for each SC. The device characteristics of an optical transmitter and optical receiver included in the optical transmission apparatus largely affect transmission characteristics.

Japanese Laid-open Patent Publication No. 2004-112781 is an example of related art.

However, after the optical transmission apparatus in the DMT modulation method has set the transmission characteristic according to the negotiation result, the device characteristics of the optical transmitter and optical receiver vary due to changes in the ambient temperature, changes in the power supply voltage, and other factors. When the power supply voltage drops, the frequency characteristic of an amplifier in the optical receiver, for example, is degraded, lowering the gain and narrowing the bandwidth. The frequency characteristic of the amplifier in the optical receiver is also degraded when the ambient temperature is raised, in which case to the gain is lowered and the bandwidth is narrowed. Particularly, when the device characteristics of the optical transmitter and optical receiver in the optical transmission apparatus are degraded, these device characteristics deviate from the transmission characteristic setting. As a result, it is difficult to maintain the transmission characteristics using allocated setting based on the initial condition. Probably it may be cause a transmission error.

In addition, if an optical transmission path between the optical transmission apparatus and the distant optical transmission apparatus is long, the characteristic of the optical transmission path and the device characteristics of a relay and other devices placed at intermediate points of the optical transmission path affect the transmission characteristic setting. Particularly, if optical multi-pass interference (MPI) occurs in the transmission path, the transmission characteristic of a DMT signal in a low-frequency bandwidth is largely degraded. As a result, a deviation from the transmission characteristic setting becomes noticeable. This makes it is difficult to maintain the transmission characteristics using allocated setting based on the initial condition. Probably it may be cause a transmission error.

FIGS. 16A and 16B illustrate examples of a transmission characteristic and the amount of allocation before and after the transmission characteristic is degraded. An optical transmission apparatus sets the amount M1 of modulation level and signal power allocation for each SC according to a transmission characteristic T1, which has not been degraded, illustrated in FIG. 16A. If the transmission characteristic is degraded during an operation, the transmission characteristic T1 is lowered as indicated by a transmission characteristic T2 illustrated in FIG. 16B, in which case it is hard to obtain the amount of modulation level and the set amount M1 of modulation level and signal power allocation for each SC, probably causing an error in the transmission of a DMT signal. That is, if a characteristic is degraded during an operation, a DMT signal may cause a transmission error.

SUMMARY

According to an aspect of the invention, a transmission apparatus includes: a first obtaining section configured to obtain a first transmission characteristic in communication of a multi-carrier signal through a transmission path between the transmission apparatus and a distant transmission apparatus; a second obtaining section configured to obtain a second transmission characteristic under a predetermined usage condition within a specified performance range of the transmission apparatus; a correcting section configured to correct the first transmission characteristic according to the second transmission characteristic; and a determining section configured to determine an amount of allocation for each subcarrier included in the multi-carrier signal, according to the first transmission characteristic that has been corrected by the correcting section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a flowchart illustrating an example of processing operation of a DMT-LSI chip in the optical transmission apparatus, the processing operation being involved in first allocation processing;

FIG. 8 illustrates an example of the first transmission characteristic and the amount of allocation after the first transmission characteristic has been corrected;

DESCRIPTION OF EMBODIMENTS

Embodiments of a transmission apparatus and a transmission method disclosed in this application will be described below in detail with reference to the drawings. The disclosed technology is not limited by these embodiments. The embodiments described below may be appropriately combined within a range in which any contradiction does not occur.

First Embodiment

Figure 1:
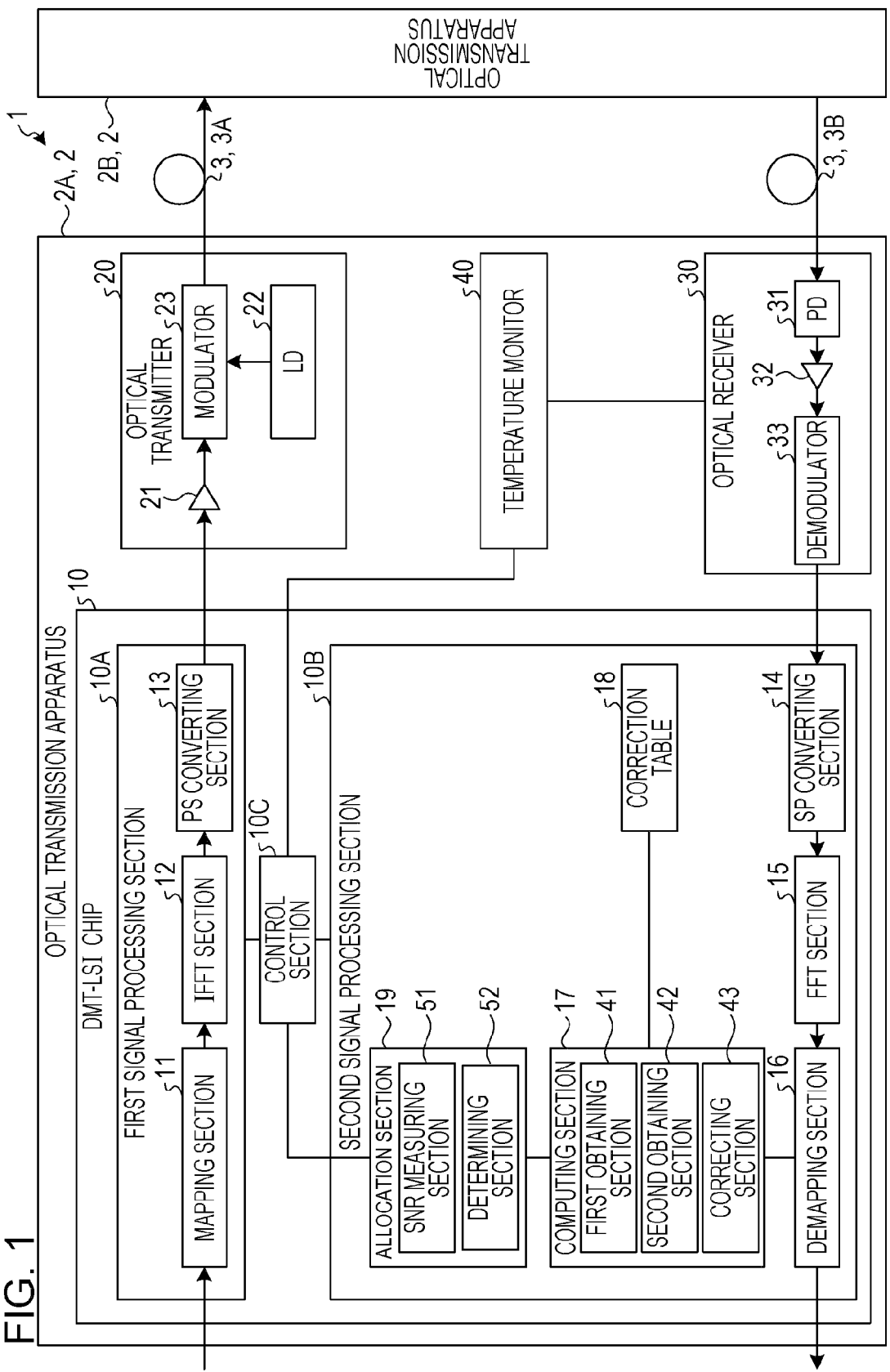
FIG. 1 illustrates an example of an optical transmission system in a first embodiment.
Figure 2:
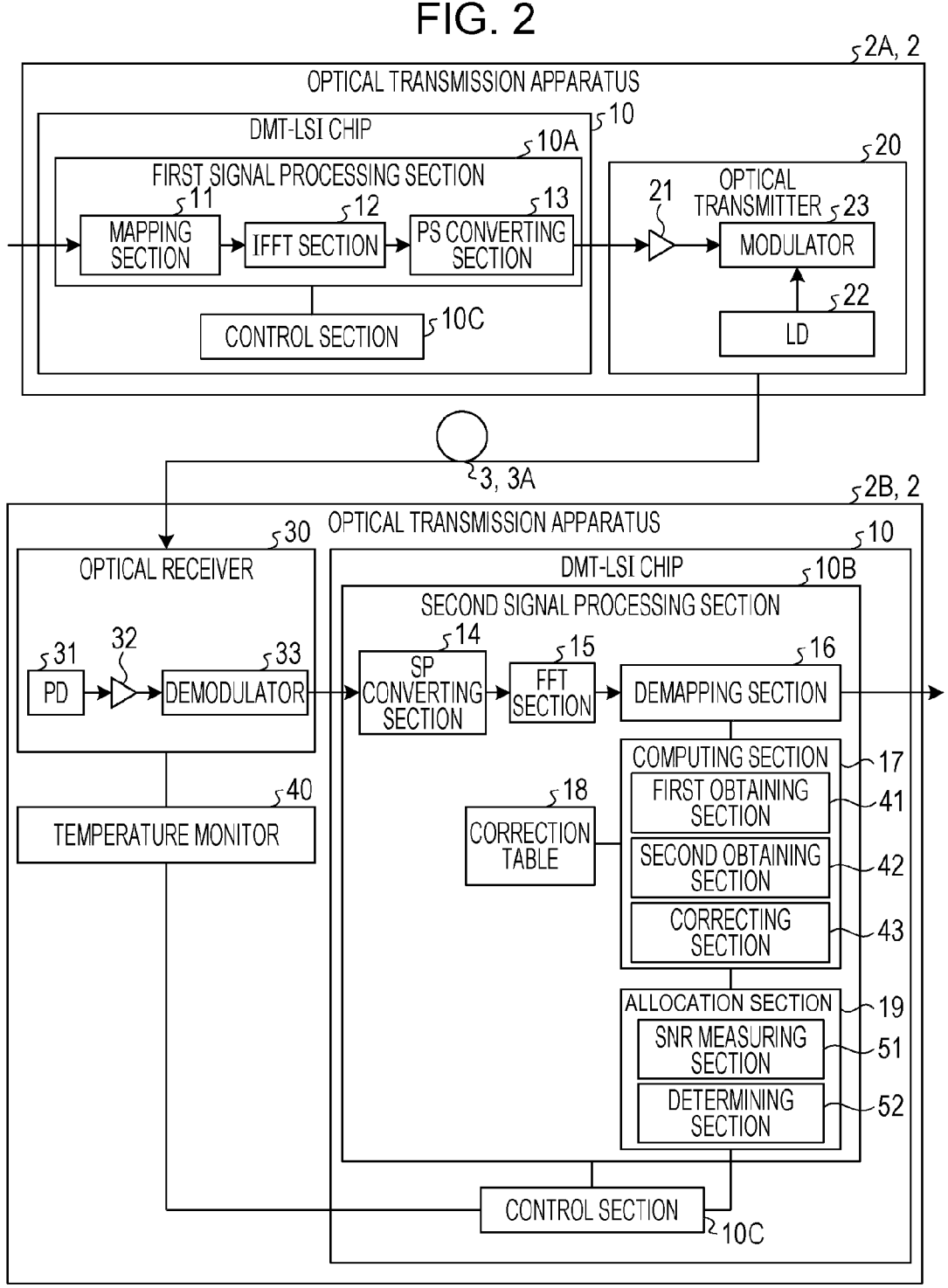
FIG. 2 is a block diagram illustrating an example of an optical transmission apparatus in the first embodiment.

FIG. 1 illustrates an example of an optical transmission system in a first embodiment. The optical transmission system 1 in FIG. 1 includes an optical transmission apparatus 2A (2), a distant optical transmission apparatus 2B (2), and optical transmission paths 3 that interconnects the optical transmission apparatus 2A and the distant optical transmission apparatus 2B. The optical transmission apparatus 2 is, for example, a transmission apparatus such as an optical module accommodated in an optical metro network, an optical core network, or the like. FIG. 2 is a block diagram illustrating an example of the optical transmission apparatus 2 in the first embodiment. The distant optical transmission apparatus 2B has the same structure as the optical transmission apparatus 2A, so identical elements will be allocated identical reference numerals, and repeated descriptions of the identical elements and identical operations will be omitted.

The optical transmission apparatus 2 includes a DMT large-scale integration (LSI) chip 10, an optical transmitter 20, an optical receiver 30, and a temperature monitor 40. The DMT large-scale integration (LSI) chip 10 may substitute two or more LSI chips. The optical transmitter 20 sends a DMT signal through an optical transmission path 3A to the distant optical transmission apparatus 2B. The optical transmitter 20 may include an amplifier 21, a laser diode (LD) 22, and a modulator. The optical transmitter 20 may also include an amplifier 21, and a laser diode (LD) 22 and a modulation driver for the LD 22. The amplifier 21 amplifies an electric signal sent from a DMT-LSI chip 10. The LD 22 oscillates and outputs an optical signal with a predetermined frequency. The modulator 23 modulates the optical signal, which has been output from the LD 22, with the electric signal, which has been amplified by the amplifier 21, to create a DMT signal and outputs the created DMT signal to the optical transmission path 3A. The optical transmission path 3A, which is, for example, an optical fiber, optically transmits the DMT signal from the optical transmission apparatus 2A to the distant optical transmission apparatus 2B. The optical receiver 30 receives a DMT signal from the distant optical transmission apparatus 2B through an optical transmission path 3B. The optical receiver 30 may include a photodiode (PD) 31, and an amplifier 32. The PD 31 optically detects the DMT signal, which has been received from the optical transmission path 3B, and converts the DMT signal to an electric signal. The amplifier 32 amplifies the electric signal, which has been converted by the PD 31. The demodulator 33 may demodulate the DMT signal, which is an amplified electric signal, and enters the demodulated signal into the DMT-LSI chip 10. The optical transmission path 3B, which is, for example, an optical fiber, optically transmits the DMT signal from the distant optical transmission apparatus 2B to the optical transmission apparatus 2A. The temperature monitor 40 is, for example, a first measuring section that measures the ambient temperature particularly around the optical receiver 30 in the optical transmission apparatus 2.

The DMT-LSI chip 10 includes a first signal processing section 10A, a second signal processing section 10B, and a control section 10C. The first signal processing section 10A, which is equivalent to a signal processing section on a transmission side, includes a mapping section 11, an inverse fast Fourier transform (IFFT) section 12, and a parallel-serial (PS) converting section 13. The mapping section 11 maps data to be allocated to each subcarrier (SC), which will be described later, according to the amount of modulation level and signal power allocation for each SC. The IFFT section 12 executes IFFT processing by which data, which is a mapping output, is decomposed for each SC, according to the amount of modulation level and signal power allocation for each SC. The PS converting section 13 performs serial conversion on data for each SC and transmits the serially converted data to the optical transmitter 20.

The second signal processing section 10B, which is equivalent to a signal processing section on a receiver side, includes a serial-parallel (SP) converting section 14, a fast-Fourier transform (FFT) section 15, a demapping section 16, a computing section 17, a correction table 18, and an allocation section 19. The SP converting section 14 performs parallel conversion on data for each SC, the data being a signal that has been demodulated from the DMT signal from the optical receiver 30. The FFT section 15 recovers SC-specific data to data in the form before the IFFT processing, according to the amount of allocation for each SC. The demapping section 16 demaps the restored data and obtains data in the form before mapping.

The computing section 17 includes a first obtaining section 41, a second obtaining section 42, and a correcting section 43. The first obtaining section 41 obtains a first transmission characteristic according to a result of a negotiation based on a probe signal at the time of the startup of the optical transmission system 1. The probe signal is a test signal used in negotiation executed when the optical transmission system 1 is started up.

Figure 3:
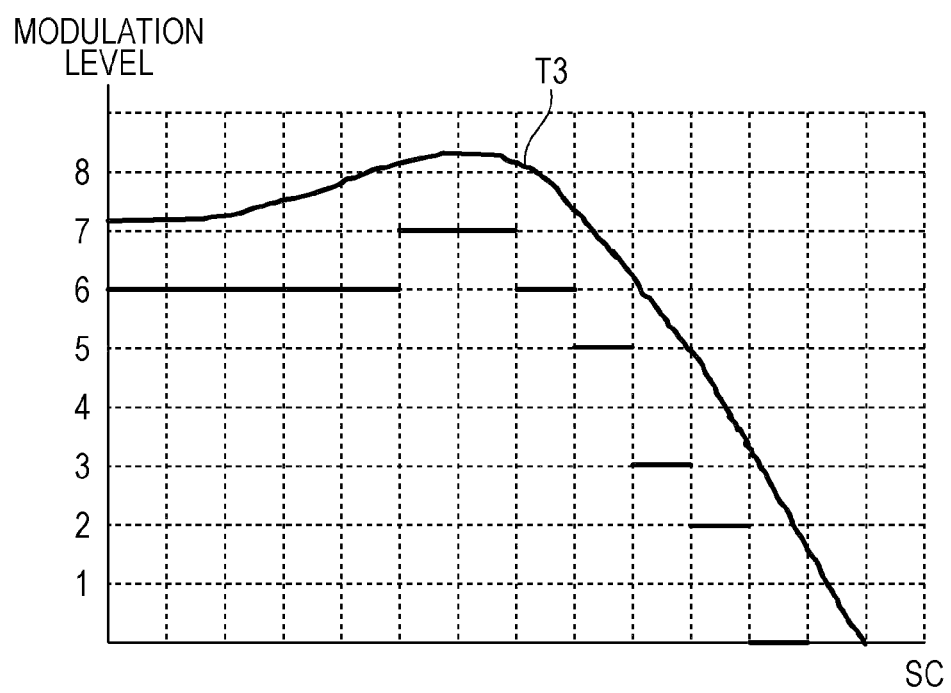
FIG. 3 illustrates an example of a first transmission characteristic and the amount of allocation.

FIG. 3 illustrates an example of the first transmission characteristic and an allocation. The first transmission characteristic T3 illustrated in FIG. 3 indicates SC-specific modulation level at the time of negotiation execution, with SCs on the horizontal axis and modulation level on the vertical axis. The granularity of the horizontal axis is a division of the frequency bandwidth of a DMT signal by the number of SCs in the DMT signal, and the granularity of the vertical axis is a division within the maximum modulation level of the DMT signal. In the example in FIG. 3, it is assumed that the baud rate per SC is 2 GBaud and the target transmission speed is 120 Gbps. Since, in the example in FIG. 3, the number of SCs for which the modulation level is 7 is 2, the number of SCs for which the modulation level is 6 is 6, the number of SCs for which the modulation level is 5 is 1, the number of SCs for which the modulation level is 3 is 1, and the number of SCs for which the modulation level is 2 is 1, 120 Gbps(=60 bits×2 GBaud) can be assured.

Figure 4A:
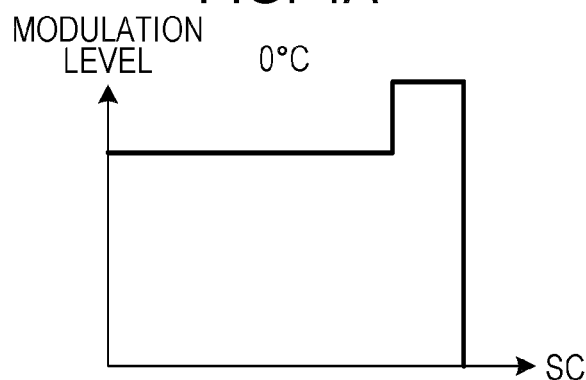
FIGS. 4A, 4B, and 4C each illustrate an example of a correction table.
Figure 4B:
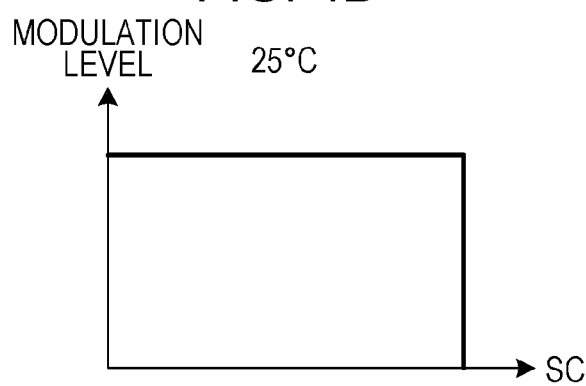
Figure 4C:
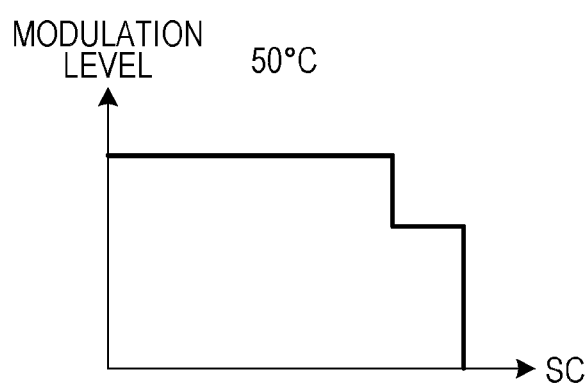

FIGS. 4A through 4C each are an example of the correction table 18. The correction table 18 manages a relative transmission characteristic, which relatively indicates the transmission characteristic of the optical transmission apparatus 2, at, for example, a particular ambient temperature around or in the optical transmission apparatus 2. The allowable temperature range within the specified performance of the optical transmission apparatus 2 is, for example, 0° C. to 50° C. At 0° C., performance is optimized in the allowable temperature range. As the temperature is raised, the transmission characteristic is gradually degraded. At 50° C., performance is at the lowest level in the allowable temperature range. The correction table 18 manages, for example, a relative transmission characteristic at 0° C. (see FIG. 4A), a relative transmission characteristic at 25° C. (see FIG. 4B), and a relative transmission characteristic at 50° C. (see FIG. 4C). For convenience of explanation, three relative transmission characteristics at 0° C., 25° C., and 50° C. have been illustrated, but relative transmission characteristics are managed at individual ambient temperatures. The relative transmission characteristic indicates the maximum modulation level for each SC in a DMT signal at each ambient temperature. The relative transmission characteristic is calculated according to the specified performance of the optical transmission apparatus 2 in advance and is stored before shipping. The correction table 18 is equivalent to, for example, a managing section, and the relative transmission characteristic is equivalent to, for example, a third transmission characteristic.

The second obtaining section 42 obtains, from the correction table 18, a relative transmission characteristic at an allowable temperature at the lowest performance within the specified performance of the optical transmission apparatus 2, the allowable temperature being, for example, 50° C. The second obtaining section 42 also obtains, from the correction table 18, a relative transmission characteristic at the ambient temperature at a time when the first transmission characteristic has been obtained. The ambient temperature at a time when the first transmission characteristic has been obtained is equivalent to an ambient temperature on the same side as the optical receiver 30 at a time when a negotiation involved in the first transmission characteristic has been executed with a probe signal.

Figure 5A:
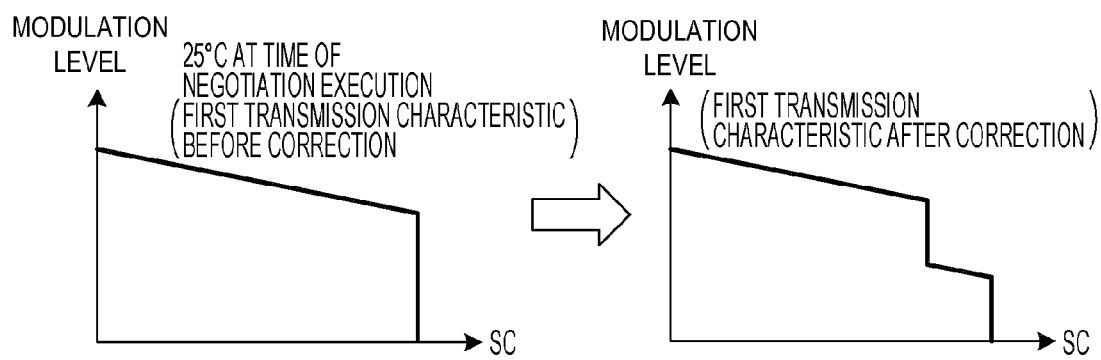
FIGS. 5A and 5B illustrate examples of the first transmission characteristic before and after it is corrected.
Figure 5B:
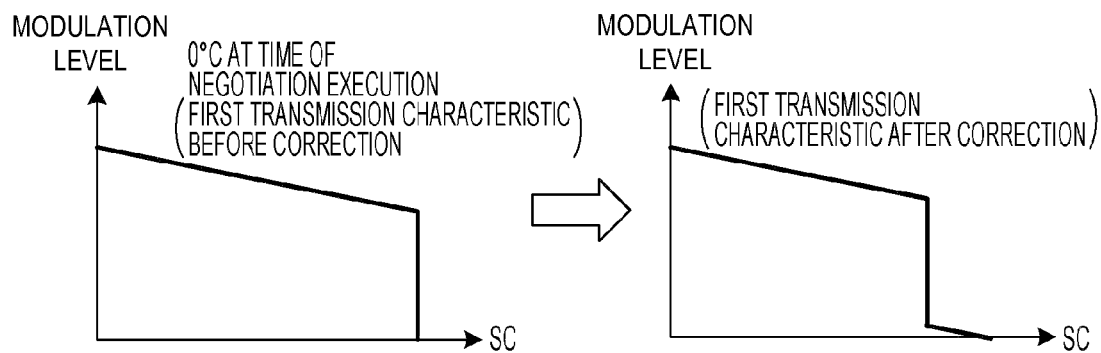

The correcting section 43 calculates a correction difference between the relative transmission characteristic at the lowest-performance allowable temperature, the relative transmission characteristic having been obtained by the second obtaining section 42, and the relative transmission characteristic at the ambient temperature at a time when the first transmission characteristic has been obtained by the second obtaining section 42 (when a negotiation has been executed). The correction difference is equivalent to, for example, a second transmission characteristic. The correcting section 43 corrects the first transmission characteristic by using the calculated correction difference. FIGS. 5A and 5B illustrate examples of the first transmission characteristic before and after it is corrected. Since the first transmission characteristic is represented by a graph with SCs on the horizontal axis and modulation level on the vertical axis, the granularities of these axes are large, so the management load and processing load can be reduced.

The correcting section 43 obtains a correction difference; if, for example, the ambient temperature around the optical receiver 30 at the time of negotiation execution is 25° C., the correcting section 43 obtains a correction difference from a difference between the relative transmission characteristic at 25° C. and the relative transmission characteristic at 50° C., which is the lowest-performance allowable temperature (the difference in temperature is 25° C.). The correcting section 43 corrects the first transmission characteristic, which has been obtained at the time of negotiation execution at 25° C., according to the correction difference, and obtains a corrected first transmission characteristic illustrated in FIG. 5A.

If, for example, the ambient temperature around the optical receiver 30 at the time of negotiation execution is 0° C., the correcting section 43 obtains a correction difference from a difference between the relative transmission characteristic at 0° C. and the relative transmission characteristic at 50° C., which is the lowest-performance allowable temperature (the difference in temperature is 50° C.). The correcting section 43 corrects the first transmission characteristic, which has been obtained at the time of negotiation execution at 0° C., according to the correction difference, and obtains a corrected first transmission characteristic illustrated in FIG. 5B.

Figure 6A:
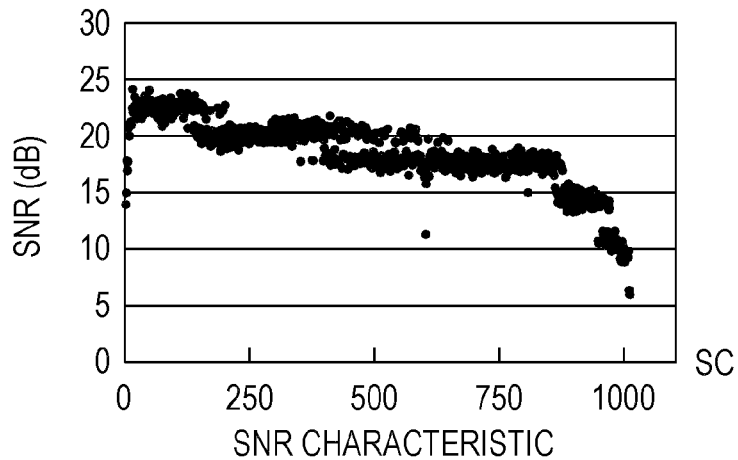
FIG. 6A, 6B, and 6C each illustrate an example that an allocation section allocates a modulation level and signal power.
Figure 6B:
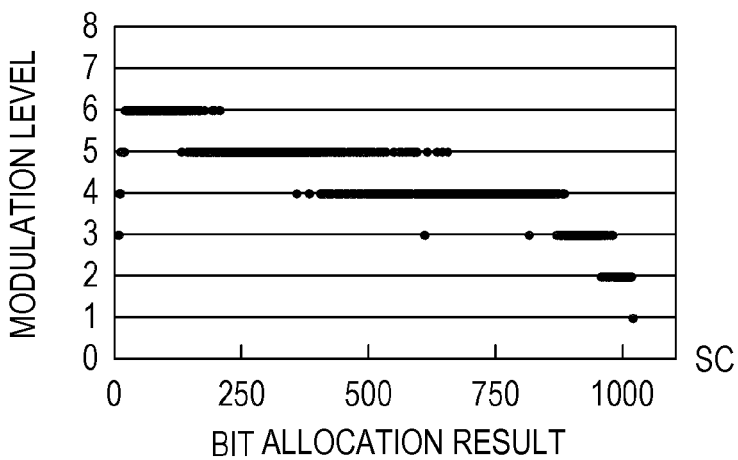
Figure 6C:
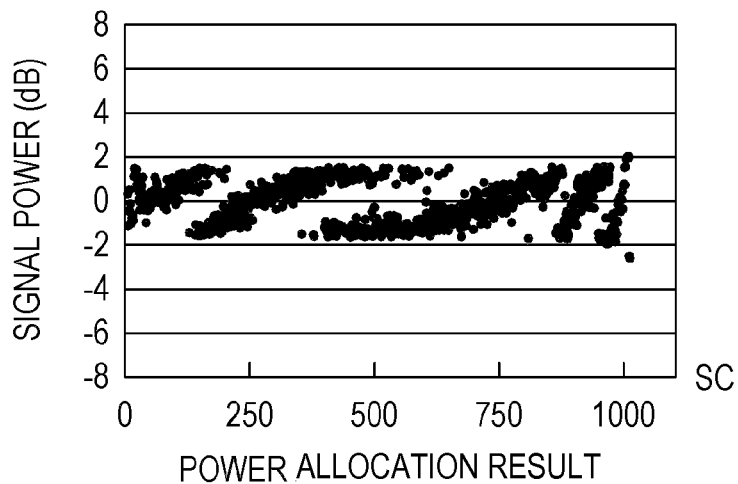

The allocation section 19 includes a signal-to-noise ratio (SNR) measuring section 51 and a determining section 52. FIGS. 6A, 6B, and 6C each illustrate an example that the allocation section 19 allocates a modulation level and signal power. The SNR measuring section 51 measures a SC-specific SNR in a DMT signal or a characteristic equivalent to the SNR, which is, for example, an error vector magnitude (EVM). The determining section 52 obtains an SNR characteristic illustrated in FIG. 6A from a measurement result produced by the SNR measuring section 51. As illustrated in FIG. 6B, the determining section 52 also determines the amount of modulation level allocation for each SC, according to the SNR characteristic. As illustrated in FIG. 6C, the determining section 52 also determines the amount of signal power allocation for each SC, according to the SNR characteristic. As an allocation method, the Chow's rate adaptive bit-loading algorithm based on the Water-filling method, for example, is used. (P. S. Chow, J. M. Cioffi, J. A. C. Bingham, "A Practical Discrete Multitone Transceiver Loading Algorithm for Data Transmission over Spectrally Shaped Channels", IEEE Trans. Commun., vol. 43, no. 2, pp. 773-775 (1995)) The allocation section 19 may determine the amount of modulation level and signal power allocation for each SC by using a margin of one bit.

Next, the operation of the optical transmission system 1 in the first embodiment will be described. FIG. 7 is a flowchart illustrating an example of processing operation of the DMT-LSI chip 10 in the optical transmission apparatus 2, the processing operation being involved in first allocation processing. FIG. 8 illustrates an example of the first transmission characteristic and the amount of allocation after the first transmission characteristic has been corrected. In first allocation processing illustrated in FIG. 7, the first transmission characteristic is corrected by using a difference between the relative transmission characteristic at the ambient temperature at the time of negotiation execution and the relative transmission characteristic at the lowest-performance allowable temperature, and the amount of modulation level and signal power allocation for each SC is determined according to the corrected first transmission characteristic.

In FIG. 7, the control section 10C in the DMT-LSI chip 10 in the optical transmission apparatus 2B decides whether a probe signal has been received from the optical transmitter 20 in the optical transmission apparatus 2A through the optical receiver 30 at the time of the startup of the optical transmission system 1 (step S11). The optical transmitter 20 in the optical transmission apparatus 2A is intended to send a probe signal to the distant optical transmission apparatus 2B at the time of the system startup. If the first obtaining section 41 in the computing section 17 in the second signal processing section 10B in the optical transmission apparatus 2B receives the probe signal through the demapping section 16 (the decision in step S11 is affirmative), the first obtaining section 41 obtains a result of the negotiation based on the probe signal (step S12). The control section 10C in the optical transmission apparatus 2B obtains the ambient temperature around the optical receiver 30 at the time of negotiation execution through the temperature monitor 40 (step S13). The first obtaining section 41 calculates the first transmission characteristic, which indicates a modulation level (signal power) for each SC, according to the obtained negotiation result (step S14).

The second obtaining section 42 in the second signal processing section 10B obtains, from the correction table 18, the relative transmission characteristic at the temperature at the time of negotiation execution and the relative transmission characteristic at the lowest-performance allowable temperature (step S15). It is assumed that the lowest-performance allowable temperature is, for example, 50° C., which is the upper limit of the allowable temperature range in the specified performance of the optical transmission apparatus 2.

The correcting section 43 calculates a correction difference from a difference between the relative transmission characteristic at the temperature at the time of negotiation execution and the relative transmission characteristic at the lowest-performance allowable temperature (step S16). The correcting section 43 corrects the first transmission characteristic according to the correction difference (step S17). As a result, the correcting section 43 obtains a first transmission characteristic T4 illustrated in FIG. 8. The allocation section 19 determines the amount M4 of modulation level and signal power allocation for each SC according to the corrected first transmission characteristic illustrated in FIG. 8 (step S18). Specifically, from the SNR value, the allocation section 19 determines the amount M4 of modulation level and signal power allocation for each SC according to the corrected first transmission characteristic.

The allocation section 19 sets the determined amount of modulation level and signal power allocation for each SC (step S19). Then, the allocation section 19 transmits the allocated amount of modulation level and signal power allocation for each SC to the distant optical transmission apparatus 2A (step S20). To transmit the determined amount of modulation level and signal power allocation for each SC, the allocation section 19 includes the determined amount in a DMT control signal such as, for example, an optical supervisory channel (OSC) signal, which is transmitted through the optical transmission path 3. As a result, in the distant optical transmission apparatus 2A as well, the amount of modulation level and signal power allocation can be set for each SC. The control section 10C starts communication with the distant optical transmission apparatus 2A (step S21) and terminates the processing operation in FIG. 7. If a probe signal has not been received from the distant optical transmission apparatus 2A (the decision in step S11 is negative), the control section 10C repeats the processing in step S11 to determine whether a probe signal has been received.

The optical transmission apparatus 2 that executes the first allocation processing in FIG. 7 obtains the first transmission characteristic according to a negotiation result obtained in communication of a probe signal from the distant optical transmission apparatus 2. The optical transmission apparatus 2 obtains, from the correction table 18, the relative transmission characteristic at the ambient temperature at the time of negotiation execution and the relative transmission characteristic at the lowest-performance allowable temperature. The optical transmission apparatus 2 calculates a correction difference from a difference between the relative transmission characteristic at the ambient temperature at the time of negotiation execution and the relative transmission characteristic at the lowest-performance allowable temperature. The optical transmission apparatus 2 corrects the first transmission characteristic according to the calculated correction difference and determines the amount of modulation level and signal power allocation for each SC in the DMT signal according to the corrected first transmission characteristic. As a result, even if a device characteristic, the characteristic of the optical transmission path 3, or the like is degraded during an operation, the occurrence of a transmission error can be efficiently suppressed.

The optical transmission apparatus 2 in the first embodiment corrects the first transmission characteristic according to a correction difference between a relative transmission characteristic at the ambient temperature at the time of negotiation execution and a relative transmission characteristic at the lowest-performance allowable temperature. Furthermore, the optical transmission apparatus 2 determines the amount of modulation level and signal power allocation for each SC, according to the corrected first transmission characteristic. As a result, even if a device characteristic, the characteristic of the optical transmission path 3, or the like is degraded during an operation, the occurrence of a transmission error can be efficiently suppressed.

The optical transmission apparatus 2 in the first embodiment manages relative transmission characteristics at particular different ambient temperatures in the correction table 18, and corrects the first transmission characteristic according to a difference between a relative transmission characteristic at the ambient temperature at the time of negotiation execution and a relative transmission characteristic at the lowest-performance allowable temperature. Furthermore, the optical transmission apparatus 2 determines the amount of modulation level and signal power allocation for each SC, according to the corrected first transmission characteristic. As a result, even if the device characteristic, the characteristic of the optical transmission path 3, or the like is degraded during an operation, the occurrence of a transmission error can be efficiently suppressed.

The first transmission characteristic and relative transmission characteristic indicate modulation level within the range of the maximum modulation level of a DMT signal on the vertical axis for a per-SC frequency bandwidth of the DMT signal on the horizontal axis. Therefore, the granularities of the horizontal axis and vertical axis can be made to be large, so the management load and processing load can be reduced.

Although, in the first embodiment described above, relative transmission characteristics have been managed in the correction table 18 at different particular ambient temperatures, functions that calculate the relative transmission characteristics may be managed. In this case, the second obtaining section 42 may obtain, from the correction table 18, functions corresponding to the ambient temperature at the time of negotiation execution and to the lowest-performance allowable temperature, and may calculate the relative transmission characteristic at the ambient temperature at the time of negotiation execution and the relative transmission characteristic at the lowest-performance allowable temperature, according to the obtained functions. As a result, it only suffices to store functions in the correction table 18, instead of the relative transmission characteristics, so it is possible to suppress the storage capacity of the correction table 18.

Although the optical transmission apparatus 2 in the first embodiment described above has managed relative transmission characteristics at different particular ambient temperatures in the correction table 18, their management is not limited to ambient temperatures; relative transmission characteristics may be managed at different power supply voltages used by the optical transmission apparatus 2. In this case, the optical transmission apparatus 2 includes a second measuring section that measures power supply voltages. The optical transmission apparatus 2 corrects the first transmission characteristic according to a difference between a relative transmission characteristic at a power supply voltage at the time of negotiation execution and a relative transmission characteristic at a power supply voltage at the lowest performance within the allowable performance. Furthermore, the optical transmission apparatus 2 can determine the amount of modulation level and signal power allocation for each SC, according to the corrected first transmission characteristic.

The optical transmission apparatus 2 may also manage relative transmission characteristics for each MPI in the correction table 18. In this case, the optical transmission apparatus 2 corrects the first transmission characteristic according to a difference between a relative transmission characteristic at MPI at the time of negotiation execution and a relative transmission characteristic at MPI at the lowest performance within the allowable performance. Furthermore, the optical transmission apparatus 2 can determine the amount of modulation level and signal power allocation for each SC, according to the correct the first transmission characteristic.

The optical transmission apparatus 2 may manage, in the correction table 18, relative transmission characteristics at different usage conditions for which the ambient temperature around or in the optical transmission apparatus 2, the power supply voltage of the optical transmission apparatus 2, and MPI are considered. In this case, the optical transmission apparatus 2 corrects the first transmission characteristic according to a difference between a relative transmission characteristic under a usage condition at the time of negotiation execution and a relative transmission characteristic under a usage condition at the lowest performance within the allowable performance. Furthermore, the optical transmission apparatus 2 can determine the amount of modulation level and signal power allocation for each SC, according to the correct the first transmission characteristic.

Although, as the usage condition, the ambient temperature, power supply voltage, and MPI have been described, the usage conditions are not limited to these factors.

Although the optical transmission apparatus 2 has included the amount of allocation and the like in an OSC signal and has transmitted the OSC signal to the distant optical transmission apparatus 2 through the optical transmission path 3, the optical transmission apparatus 2 may use a control line different from the optical transmission path 3 to transmit the amount of allocation and other information to the distant optical transmission apparatus 2.

In the optical transmission apparatus 2 in the first embodiment described above, the computing section 17, correction table 18, and allocation section 19 have been included in the second signal processing section 10B. However, the optical transmission apparatus 2 may have a computing section 17A, a correction table 18A, and an allocation section 19A in the first signal processing section 10A. An embodiment in this case will be described below as a second embodiment.

Second Embodiment

Figure 9:
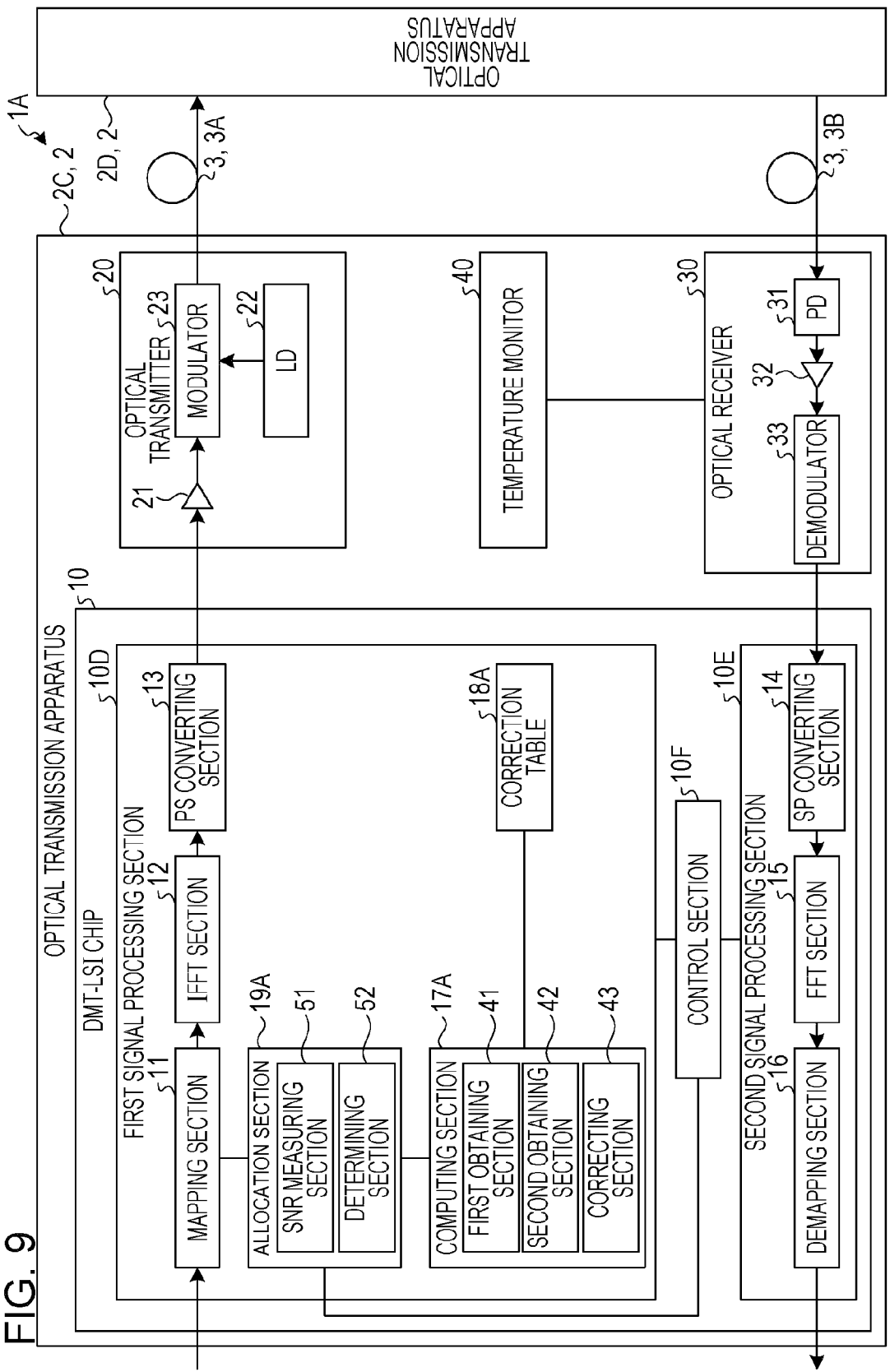
FIG. 9 illustrates an example of an optical transmission system in a second embodiment.
Figure 10:
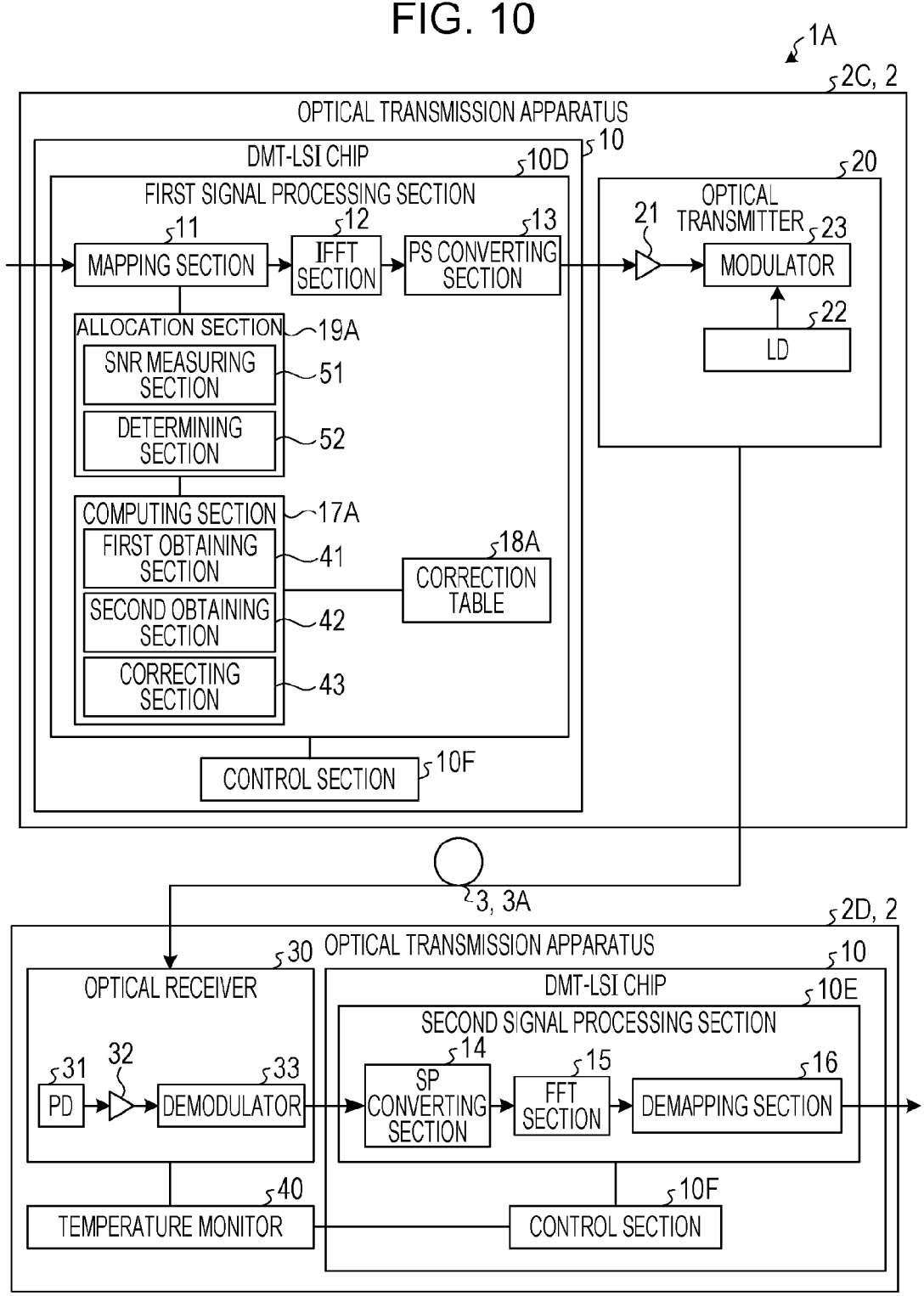
FIG. 10 is a block diagram illustrating an example of an optical transmission apparatus in the second embodiment.

FIG. 9 illustrates an example of an optical transmission system 1A in a second embodiment. FIG. 10 is a block diagram illustrating an example of an optical transmission apparatus 2C in the second embodiment. Elements identical to those in the optical transmission system 1 in the first embodiment will be allocated identical reference numerals, and repeated descriptions of the identical elements and identical operations will be omitted.

The optical transmission apparatus 2C illustrated in FIG. 9 has the computing section 17A, correction table 18A, and allocation section 19A in a first signal processing section 10D. The optical transmission apparatus 2C sends a probe signal to a distant optical transmission apparatus 2D through the optical transmission path 3. The distant optical transmission apparatus 2D obtains a result of the negotiation based on the probe signal received from the optical transmission apparatus 2C. Furthermore, the distant optical transmission apparatus 2D obtains an ambient temperature around the optical receiver 30 at the time of negotiation execution through the temperature monitor 40. The distant optical transmission apparatus 2D then transfers the result of the negotiation based on the probe signal and the ambient temperature at the time of negotiation execution to the optical transmission apparatus 2C by using an OSC signal.

The first obtaining section 41 in the first signal processing section 10D in the optical transmission apparatus 2C obtains the first transmission characteristic according to the negotiation result from the distant optical transmission apparatus 2D. Furthermore, the second obtaining section 42 in the first signal processing section 10D obtains, from the correction table 18A, the relative transmission characteristic at the ambient temperature at the time of negotiation execution and the relative transmission characteristic at the lowest-performance allowable temperature. The correcting section 43 then calculates a correction difference between the relative transmission characteristic at the ambient temperature at the time of negotiation execution and the relative transmission characteristic at the lowest-performance allowable temperature. The correcting section 43 corrects the first transmission characteristic according to the correction difference. The allocation section 19A determines the amount of modulation level and signal power allocation for each SC, according to the corrected first transmission characteristic. The allocation section 19A then sets the determined amount of modulation level and signal power allocation for each SC in the mapping section 11 and IFFT section 12. Furthermore, the allocation section 19A notifies the distant optical transmission apparatus 2D of the amount of modulation level and signal power allocation for each SC by using an OSC signal.

Figure 11:
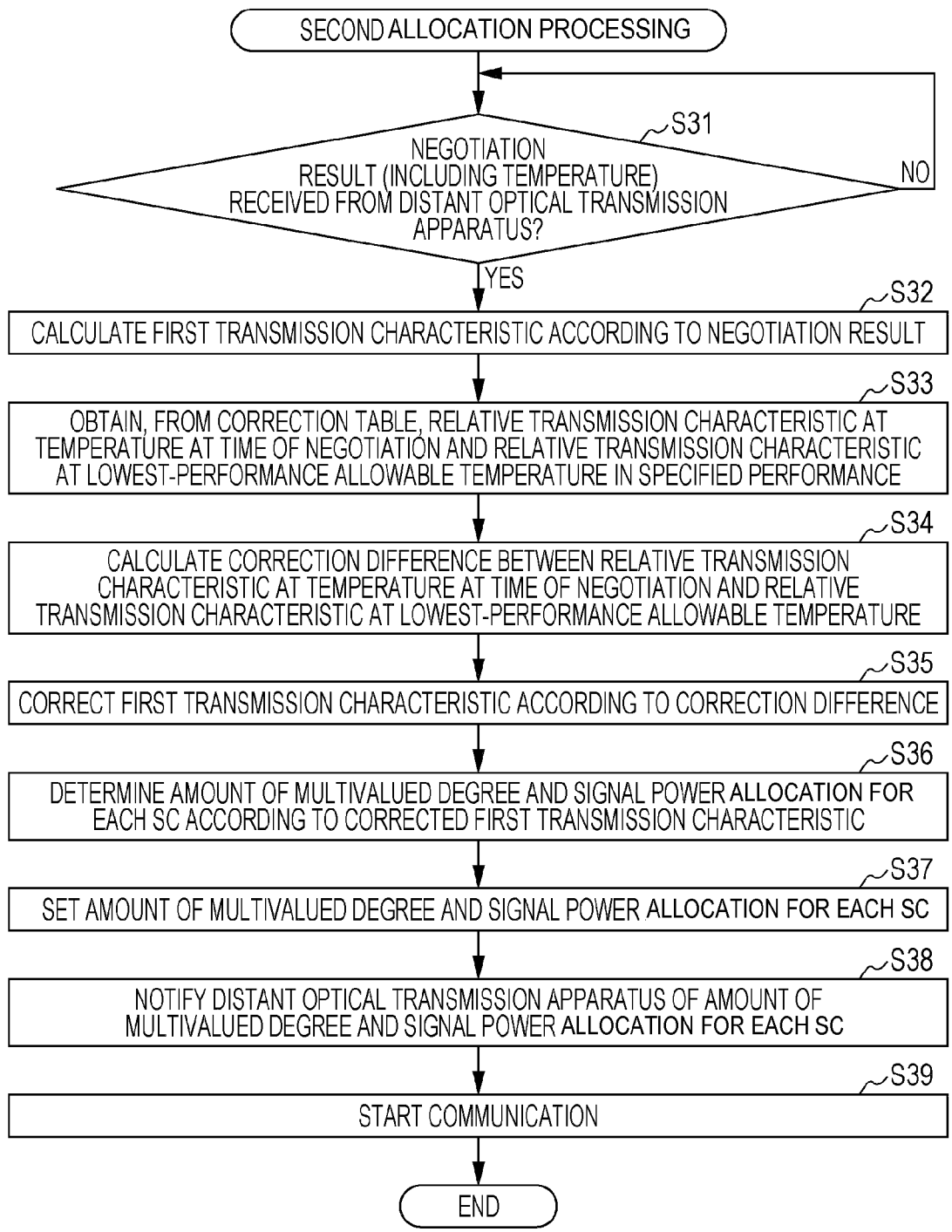
FIG. 11 is a flowchart illustrating an example of processing operation of the DMT-LSI chip in the optical transmission apparatus, the processing operation being involved in second allocation processing.

Next, the operation of the optical transmission system 1A in the second embodiment will be described. FIG. 11 is a flowchart illustrating an example of processing operation of the DMT-LSI chip 10 in the optical transmission apparatus 2, the processing operation being involved in second allocation processing. In second allocation processing, a negotiation result is obtained from the distant optical transmission apparatus 2, the first transmission characteristic is corrected by using a difference between a relative transmission characteristic at an ambient temperature at the time of negotiation execution and a relative transmission characteristic at the lowest-performance allowable temperature, and the amount of allocation for each SC is determined by using the corrected first transmission characteristic.

In FIG. 11, a control section 10F in the computing section 17A in the optical transmission apparatus 2C decides whether a result of a negotiation based on a probe signal has been received from the distant optical transmission apparatus 2D at the time of the startup of the optical transmission system 1A (step S31). The negotiation result includes the ambient temperature around the optical receiver 30 at the time of negotiation execution. If the first obtaining section 41 receives a negotiation result from the distant optical transmission apparatus 2D (the decision in step S31 is affirmative), the first obtaining section 41 calculates the first transmission characteristic, which indicates a modulation level and signal power for each SC, according to the negotiation result (step S32).

The second obtaining section 42 in the computing section 17A obtains, from the correction table 18A, the relative transmission characteristic at the ambient temperature at the time of negotiation execution and the relative transmission characteristic at the lowest-performance allowable temperature (step S33). The correcting section 43 then calculates a correction difference from a difference between the relative transmission characteristic at the ambient temperature at the time of negotiation execution and the relative transmission characteristic at the lowest-performance allowable temperature (step S34). The correcting section 43 corrects the first transmission characteristic according to the correction difference (step S35). The allocation section 19A determines the amount of modulation level and signal power allocation for each SC, according to the corrected first transmission characteristic (step S36).

The allocation section 19A then sets the determined amount of modulation level and signal power allocation for each SC (step S37). Furthermore, the control section 10F transmits the determined amount of modulation level and signal power allocation for each SC to the distant optical transmission apparatus 2D by using an OSC signal (step S38). As a result, the distant optical transmission apparatus 2D sets the amount of modulation level and signal power allocation in a second signal processing section 10E. Then, the control section 10F starts communication with the distant optical transmission apparatus 2D (step S39) and terminates the processing operation in FIG. 11. If a result of the negotiation based on the probe signal has not been received from the distant optical transmission apparatus 2D (the decision in step S31 is negative), the control section 10F repeats the processing in step S31 to determine whether a probe signal has been received.

The optical transmission apparatus 2 that executes the second allocation processing illustrated in FIG. 11 obtains the negotiation result obtained in communication of the probe signal from the distant optical transmission apparatus 2 through communication based on a probe signal and also obtains the ambient temperature at the time of negotiation execution. The optical transmission apparatus 2 obtains the first transmission characteristic according to the obtained negotiation result and the obtained ambient temperature at the time of negotiation execution. The optical transmission apparatus 2 obtains, from the correction table 18, the relative transmission characteristic at the ambient temperature at the time of negotiation execution and the relative transmission characteristic at the lowest-performance allowable temperature. The optical transmission apparatus 2 then calculates a correction difference from a difference between the relative transmission characteristic at the ambient temperature at the time of negotiation execution and the relative transmission characteristic at the lowest-performance allowable temperature. The optical transmission apparatus 2 corrects the first transmission characteristic according to the calculated correction difference and determines the amount of modulation level and signal power allocation for each SC in the DMT signal, according to the corrected first transmission characteristic. As a result, the processing load on the optical transmission apparatus 2 on the reception side can be reduced. Even if a device characteristic, the characteristic of the optical transmission path 3, or the like is degraded during an operation, the occurrence of a transmission error can be efficiently suppressed.

The optical transmission apparatus 2 in the second embodiment, which has the computing section 17A, correction table 18A, and allocation section 19A in the first signal processing section 10D, obtains a negotiation result and an ambient temperature at the time of negotiation execution from the distant optical transmission apparatus 2. The first signal processing section 10D obtains the first transmission characteristic according to the negotiation result including the ambient temperature at the time of negotiation execution, and obtains, from the correction table 18A, the relative transmission characteristic at the ambient temperature at the time of negotiation execution and the relative transmission characteristic at the lowest-performance allowable temperature. The first signal processing section 10D then corrects the first transmission characteristic according to a difference between the relative transmission characteristic at the ambient temperature at the time of negotiation execution and the relative transmission characteristic at the lowest-performance allowable temperature, and determines the amount of modulation level and signal power allocation for each SC in the DMT signal, according to the corrected first transmission characteristic. As a result, since the computing section 17A, correction table 18A, and allocation section 19A are included in the first signal processing section 10D, the processing load on the second signal processing section 10E can be reduced.

As for the optical transmission apparatus 2 in the first and second embodiments described above, a relative transmission characteristic at the lowest-performance allowable temperature has been created before shipping and has been stored in the correction table 18 (18A) in advance. However, a mechanism that reproduces the relative transmission characteristic at the lowest-performance allowable temperature under an experimental environment may be incorporated into the optical transmission apparatus 2. An embodiment applicable to this case will be described below as a third embodiment.

Third Embodiment

Figure 12:
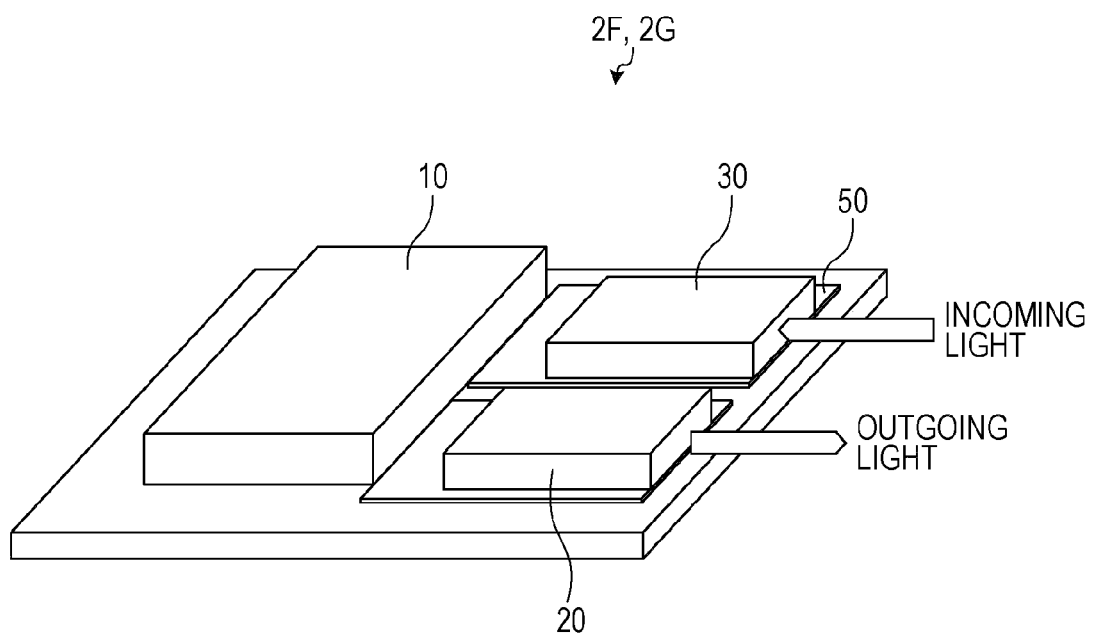
FIG. 12 illustrates an example of an optical transmission apparatus in a third embodiment.
Figure 13:
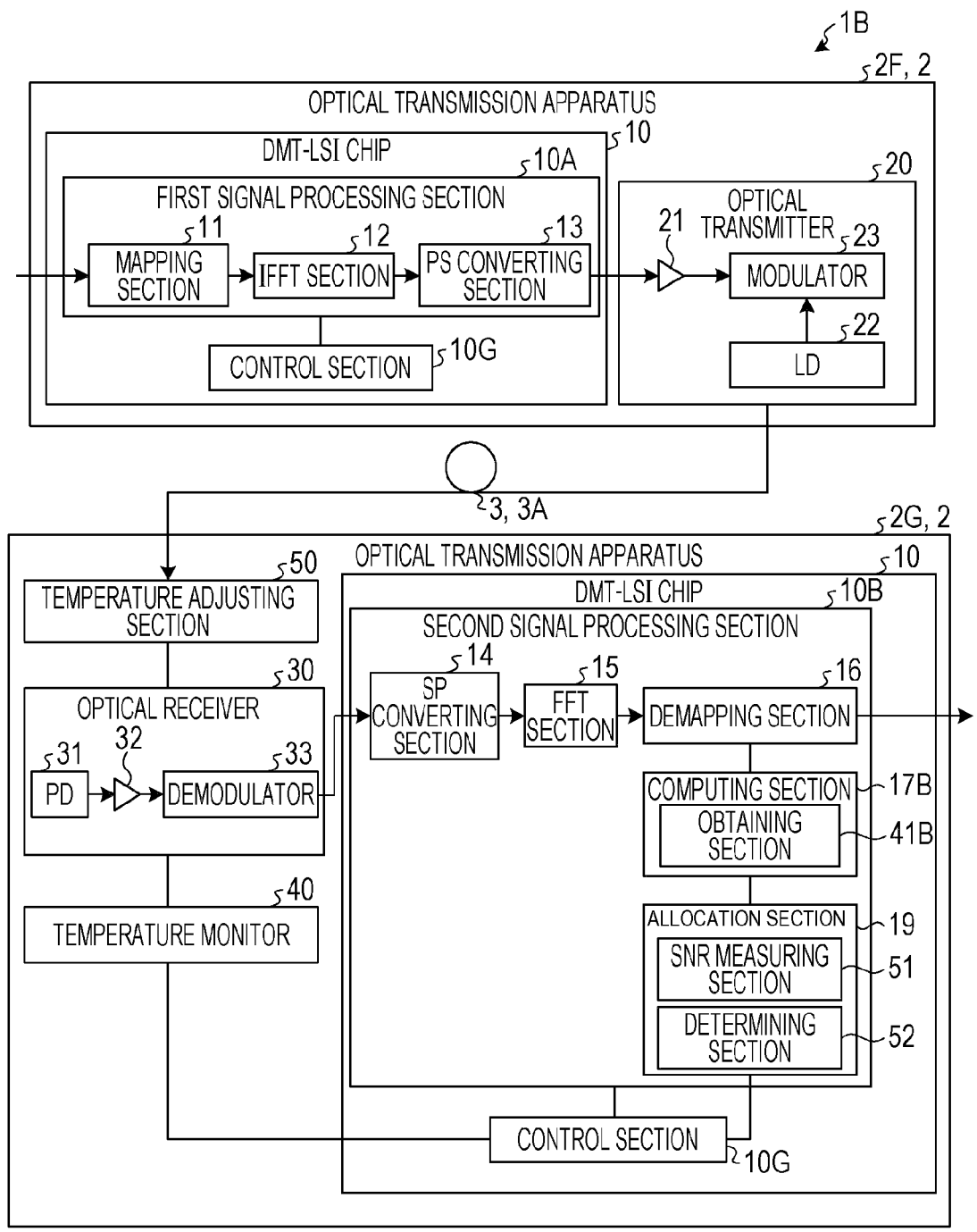
FIG. 13 is a block diagram illustrating the example of the optical transmission apparatus in the third embodiment.

FIG. 12 illustrates an example of an optical transmission apparatus 2F (2G) in a third embodiment. FIG. 13 is a block diagram illustrating the example of the optical transmission apparatus 2F (2G) in the third embodiment. Elements identical to those in the optical transmission apparatus 2 in the first embodiment will be allocated identical reference numerals, and repeated descriptions of the identical elements and identical operations will be omitted.

The optical transmission apparatus 2F illustrated in FIG. 12 differs from the optical transmission apparatus 2 in the first embodiment in that in the optical transmission apparatus 2F, a temperature adjusting section 50 is placed on the bottom surface of the optical receiver 30. The temperature adjusting section 50 is used to adjust the ambient temperature around the optical receiver 30 to the lowest-performance allowable temperature, after which a transmission characteristic is obtained by using a probe signal and the amount of allocation is determined according to the obtained transmission characteristic. The temperature adjusting section 50 is a member that adjusts the ambient temperature around the optical receiver 30. The optical transmission apparatus 2G has the same structure as the optical transmission apparatus 2F, so identical elements will be allocated identical reference numerals, and repeated descriptions of the identical elements and identical operations will be omitted. A control section 10G in the optical transmission apparatus 2G illustrated in FIG. 13 turns on the temperature adjusting section 50 at the time of the startup of an optical transmission system 1B to raise the ambient temperature around the optical receiver 30 to the lowest-performance allowable temperature, which is, for example, 50° C. The control section 10G monitors the ambient temperature around the optical receiver 30 through the temperature monitor 40. After the ambient temperature around the optical receiver 30 has been raised to the lowest-performance allowable temperature, the control section 10G requests the distant optical transmission apparatus 2F to transmit a probe signal. If an obtaining section 41B in a computing section 17B in the optical transmission apparatus 2G receives a probe signal through the optical transmission path 3, the obtaining section 41B obtains the relative transmission characteristic at the lowest-performance allowable temperature, according to the negotiation result. The allocation section 19 determines the amount of modulation level and signal power allocation for each SC, according to the relative transmission characteristic, obtained by the obtaining section 41B, at the lowest-performance allowable temperature.

Figure 14:
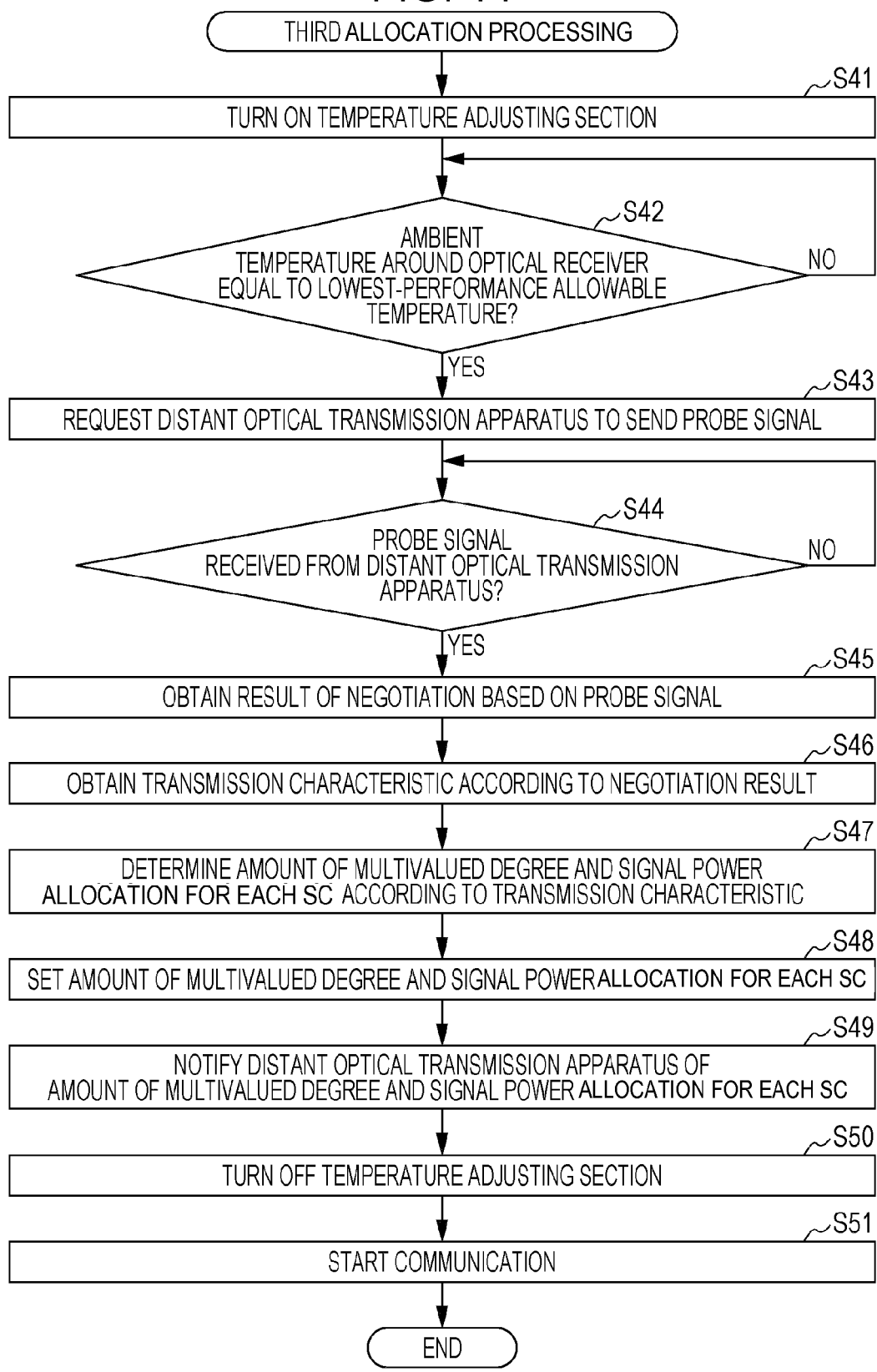
FIG. 14 is a flowchart illustrating an example of processing operation of the DMT-LSI chip in the optical transmission apparatus, the processing operation being involved in third allocation processing.

Next, the operation of the optical transmission system 1B in the third embodiment will be described. FIG. 14 is a flowchart illustrating an example of processing operation of the DMT-LSI chip 10 in the optical transmission apparatus 2G, the processing operation being involved in third allocation processing. In third allocation processing, a transmission characteristic at the lowest-performance allowable temperature is obtained in an actual environment, and the amount of modulation level and signal power allocation for each SC is determined according to the obtained transmission characteristic.

In FIG. 14, the control section 10G in the distant optical transmission apparatus 2G turns on the temperature adjusting section 50 at the time of the startup of the optical transmission system 1B (step S41). The control section 10G decides, through the temperature monitor 40, whether the ambient temperature around the optical receiver 30 is the lowest-performance allowable temperature (step S42). If the ambient temperature around the optical receiver 30 is the lowest-performance allowable temperature (the decision in step S42 is affirmative), the control section 10G requests the distant optical transmission apparatus 2F to send a probe signal (step S43).

The control section 10G decides, through the optical receiver 30, whether a probe signal has been received from the distant optical transmission apparatus 2F through the optical transmission path 3 (step S44). If a probe signal has been received (the decision in step S44 is affirmative), the control section 10G obtains a result of the negotiation based on the probe signal (step S45). The obtaining section 41B obtains a transmission characteristic at the lowest-performance allowable temperature according to the obtained negotiation result (step S46).

The allocation section 19 determines the amount of modulation level and signal power allocation for each SC according to the obtained transmission characteristic at the lowest-performance allowable temperature (step S47). The allocation section 19 sets the determined amount of modulation level and signal power allocation for each SC (step S48). Furthermore, the allocation section 19 transmits the determined amount of modulation level and signal power allocation for each SC to the distant optical transmission apparatus 2F by using an OSC signal (step S49). When the OSC signal is received, the distant optical transmission apparatus 2F sets the amount of modulation level and signal power allocation for each SC, the amount being included in the OSC signal. Then, the control section 10G turns off the temperature adjusting section 50 (step S50), which has been turned on, starts communication with the distant optical transmission apparatus 2F (step S51), and terminates the processing operation in FIG. 14.

If the ambient temperature around the optical receiver 30 is not the lowest-performance allowable temperature (the decision in step S42 is negative), the control section 10G leaves the temperature adjusting section 50 in the state in which the temperature adjusting section 50 has been turned on in step S41 so that the ambient temperature around the optical receiver 30 is raised. If a probe signal has not been received from the distant optical transmission apparatus 2F (the decision in step S44 is negative), the control section 10G repeats the processing in step S44 to determine whether a probe signal has been received.

The optical transmission apparatus 2F (2G) that executes the third allocation processing illustrated in FIG. 14 raises the ambient temperature around the optical receiver 30 to the lowest-performance allowable temperature through the temperature adjusting section 50 at the time of a system startup. After the ambient temperature around the optical receiver 30 has been raised to the lowest-performance allowable temperature, the optical transmission apparatus 2F (2G) executes a negotiation by using a probe signal and obtains the transmission characteristic at the lowest-performance allowable temperature. The optical transmission apparatus 2F (2G) determines the amount of modulation level and signal power allocation for each SC according to the transmission characteristic at the lowest-performance allowable temperature. As a result, even if a device characteristic, the characteristic of the optical transmission path 3, or the like is degraded during an operation, the occurrence of a transmission error can be efficiently suppressed without holding the relative transmission characteristic.

The optical transmission apparatus 2F (2G) in the third embodiment uses the temperature adjusting section 50 to raise the ambient temperature around the optical receiver 30 to the lowest-performance allowable temperature, after which the optical transmission apparatus 2F (2G) executes a negotiation by using a probe signal and obtains the transmission characteristic at the lowest-performance allowable temperature according to a negotiation result. The optical transmission apparatus 2F (2G) determines the amount of modulation level and signal power allocation for each SC according to the transmission characteristic at the lowest-performance allowable temperature. As a result, even if a device characteristic, the characteristic of the optical transmission path 3, or the like is degraded during an operation, the occurrence of a transmission error can be efficiently suppressed without holding the relative transmission characteristic.

Although, in the first and second embodiments described above, a case in which the computing section 17, correction table 18, and allocation section 19 are incorporated into the optical transmission apparatus 2 has been taken as an example, the computing section 17, correction table 18, and allocation section 19 may be incorporated into a management apparatus, other than the optical transmission apparatus 2, that manages the optical transmission system. Although, in the third embodiment described above, a case in which the computing section 17B and allocation section 19 are incorporated into the optical transmission apparatus 2F (2G) has been taken as an example, the computing section 17B and allocation section 19 may be incorporated into a management apparatus other than the optical transmission apparatus 2F (2G).

Although, in the first to third embodiments described above, various types of information has been included in an OSC signal and the OSC signal has been transmitted through the optical transmission path 3 provided between the optical transmission apparatuses 2, the various types of information may be transmitted through a control line, instead of the optical transmission path 3.

Although the optical transmitter 20 in the first to third embodiments described above has been structured with the amplifier 21, LD 22, and modulator 23, a directly modulating LD may be used instead of the LD 22 and modulator 23.

Although, in the first to third embodiments described above, the optical transmission apparatus 2 in the DMT modulation method has been taken as an example, the present disclosure can also be applied to optical transmission apparatuses in other multi-carrier modulation methods by which data is allocated to a plurality of SCs and data allocated to each SC is modulated. For example, the present disclosure can also be applied to optical transmission apparatuses in the orthogonal frequency division multiplexing (OFDM) modulation method and various types of phase shift keying (PSK) modulation methods including the quadrature PSK (QPSK) modulation method. In addition, the present disclosure can be applied to optical transmission apparatuses in the differential phase shift keying (DPSK) modulation method and 8PSK modulation method.

The physical forms of the constituent elements in various sections illustrated in the drawings may not be limited as illustrated in the drawings. That is, specific aspects of the separation and integration of individual sections are not limited as illustrated in the drawings; all or part of these sections may be functionally or physically separated or integrated in a desired unit, depending on various loads, the usage status, and the like.

In addition, all or part of processing functions executed in each apparatus may be executed in a central processing unit (CPU), a digital signal processor (DSP), a field programmable gate array (FPGA), or the like. Alternatively, all or part of these processing functions may be executed by programs interpreted and executed by the CPU or the like or by wired-logic hardware.

Areas in which to store various types of information may be formed with a read-only memory (ROM) or a random-access memory (RAM) such as a synchronous dynamic random-access memory (SDRAM), a magnetoresistive random-access memory (MRAM), or a non-volatile random-access memory (NVRAM).

Figure 15:
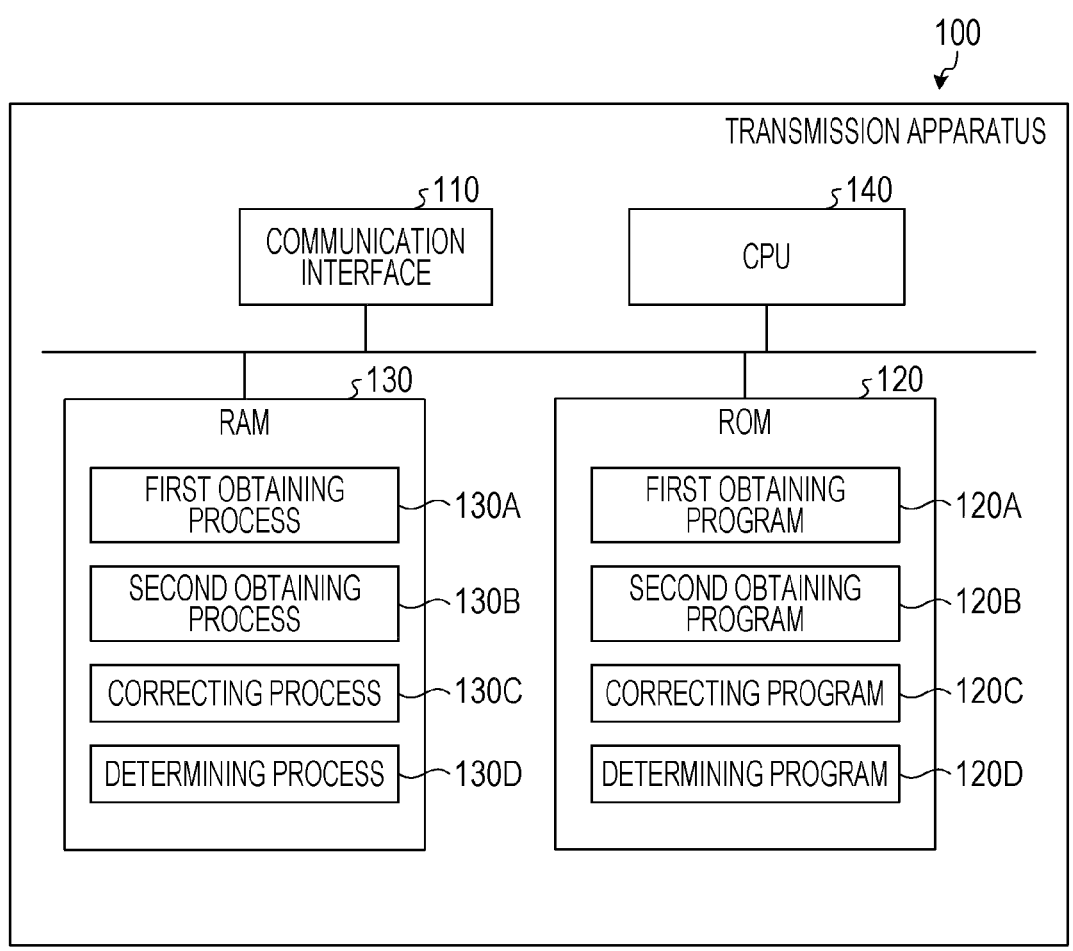
FIG. 15 illustrates a transmission apparatus that executes transmission programs.
Figure 16A:
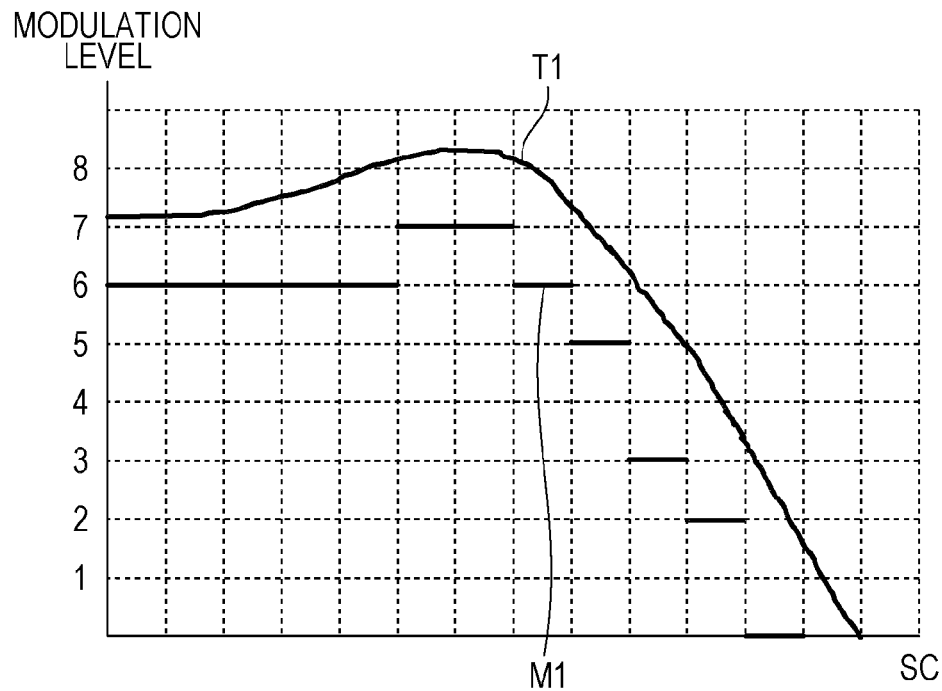
FIGS. 16A and 16B illustrate examples of a transmission characteristic and the amount of allocation before and after the transmission characteristic is degraded.
Figure 16B:
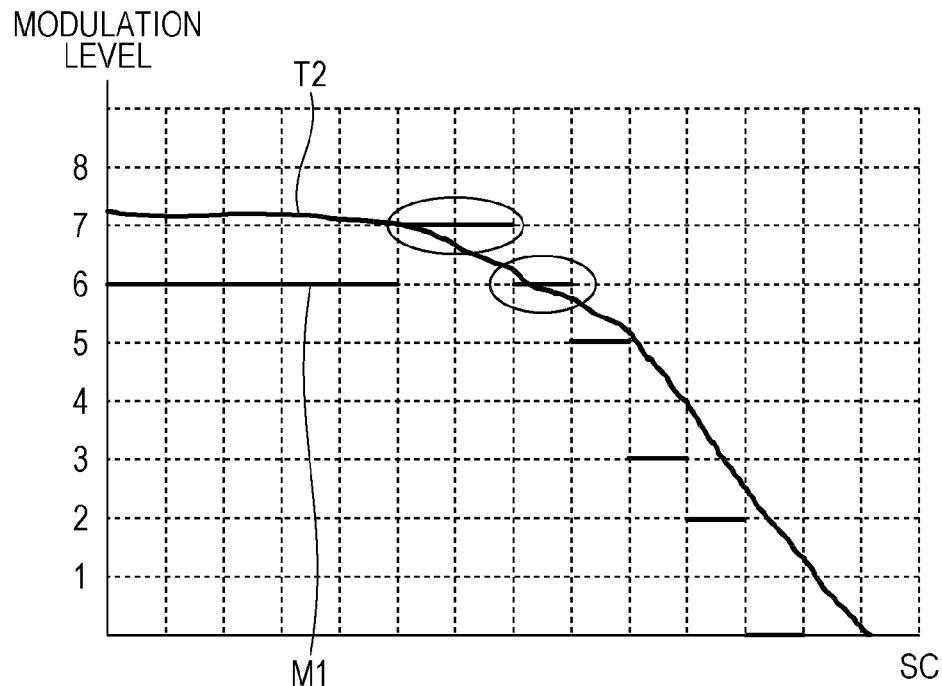

Various types of processing described in the embodiments described above can be implemented by executing programs prepared in advance with an optical module. An example of a transmission apparatus, such as an optical module, that executes programs having functions similar to the functions in the embodiments described above will be described below. FIG. 15 illustrates a transmission apparatus 100 that executes transmission programs.

As illustrated in FIG. 15, the transmission apparatus 100, which executes transmission programs, includes a communication interface 110, a ROM 120, a RAM 130, and a CPU 140. Although not illustrated, the communication interface 110 is connected to a transmission path to transmit a multi-carrier signal to another transmission apparatus.

Transmission programs that implement functions similar to the functions in the embodiments described above are stored in the ROM 120 in advance. The transmission programs may be stored in a recording medium readable to a drive (not illustrated) instead of the ROM 120. The recording medium may be a portable recording medium such as a compact disc-read-only memory (CD-ROM), a digital versatile disc (DVD), a universal serial bus (USB) memory, or a secure digital (SD) card, or may be a semiconductor memory such as a flash memory. The transfer programs may be obtained from a storage apparatus with which the transmission apparatus 100 can communicate through a network. As illustrated in FIG. 15, the transfer programs include a first obtaining program 120A, a second obtaining program 120B, a correcting program 120C, and a determining program 120D. The first obtaining program 120A, second obtaining program 120B, correcting program 120C, and determining program 120D may be appropriately integrated or separated.

The CPU 140 reads out the first obtaining program 120A, second obtaining program 120B, correcting program 120C, and determining program 120D from the ROM 120 and executes the read-out programs in the RAM 130. In the RAM 130, the CPU 140 causes the first obtaining program 120A, second obtaining program 120B, correcting program 120C, and determining program 120D to respectively function as a first obtaining process 130A, a second obtaining process 130B, a correcting process 130C, and a determining process 130D.

The CPU 140 obtains the first transmission characteristic in communication of a test signal between the CPU 140 and a distant transmission apparatus, which is connected through a transmission path. Furthermore, the CPU 140 obtains the second transmission characteristic under a predetermined usage condition within the specified performance of the transmission apparatus. The CPU 140 then corrects the first transmission characteristic according to the second transmission characteristic, and determines the amount of allocation for each SC in a multi-carrier signal according to the corrected first transmission characteristic. As a result, even if characteristic degradation occurs during an operation, an error can be efficiently suppressed in multi-carrier transmission.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus, comprising:
   a device including a processor or a circuit for executing processing functions and the device configured to
      obtain a first transmission characteristic in communication of a multi-carrier signal through a transmission path between the transmission apparatus and a distant transmission apparatus;
      obtain a second transmission characteristic under a predetermined usage condition within a specified performance range of the transmission apparatus;
      correct the first transmission characteristic according to the second transmission characteristic; and
      determine an allocation characteristic for each subcarrier included in the multi-carrier signal, according to the first transmission characteristic that has been corrected by the device.

2. The transmission apparatus according to claim 1, wherein the device is configured to
   manage, for each usage condition under which the transmission apparatus is used, a third transmission characteristic related to the respective usage condition, and
   obtain, from the device, the third transmission characteristic corresponding to a usage condition at a time when the first transmission characteristic is obtained and the third transmission characteristic corresponding to a usage condition under the predetermined usage condition, and obtain, as the second transmission characteristic, a difference between the third transmission characteristic corresponding to the usage condition at the time when the first transmission characteristic is obtained and the third transmission characteristic corresponding to the usage condition under the predetermined usage condition.

3. The transmission apparatus according to claim 2, wherein:
   the device is configured to
   manage the third transmission characteristic that indicates a modulation level specific to each subcarrier included in the multi-carrier signal, within a maximum modulation level; and
   correct the modulation level specific to each subcarrier within the first transmission characteristic according to the second transmission characteristic.

4. The transmission apparatus according to claim 3, wherein:
   the device is configured to manage a function that calculates the second transmission characteristic under the predetermined usage condition; and
   the device is configured to obtain the second transmission characteristic under the predetermined usage condition according to the function that calculates the second transmission characteristic under the predetermined usage condition, the function being in the device.

5. The transmission apparatus according to claim 2, wherein:
   the device is configured to
   manage a function that calculates the second transmission characteristic under the predetermined usage condition; and
   obtain the second transmission characteristic under the predetermined usage condition according to the function that calculates the second transmission characteristic under the predetermined usage condition, the function being in the device.

6. The transmission apparatus according to claim 1, wherein the device is configured to
   manage, for each temperature in which the transmission apparatus is used, a third transmission characteristic related to a usage condition at the respective temperature, and the device is configured to obtain a temperature in the transmission apparatus, and
   obtain, from the device, the third transmission characteristic at a temperature at a time when the first transmission characteristic is obtained and the third transmission characteristic at a temperature under the predetermined usage condition, and obtain, as the second transmission characteristic, a difference between the third transmission characteristic at the temperature at the time when the first transmission characteristic is obtained and the third transmission characteristic at the temperature under the predetermined usage condition.

7. The transmission apparatus according to claim 6, wherein:
   the device is configured to
   manage the third transmission characteristic that indicates a modulation level specific to each subcarrier included in the multi-carrier signal, within a maximum modulation level; and
   correct the modulation level specific to each subcarrier within the first transmission characteristic according to the second transmission characteristic.

8. The transmission apparatus according to claim 7, wherein:
   the device is configured to manage a function that calculates the second transmission characteristic under the predetermined usage condition; and
   the device is configured to obtain the second transmission characteristic under the predetermined usage condition according to the function that calculates the second transmission characteristic under the predetermined usage condition, the function being in the device.

9. The transmission apparatus according to claim 6, wherein:
   the device is configured to
   manage a function that calculates the second transmission characteristic under the predetermined usage condition; and
   obtain the second transmission characteristic under the predetermined usage condition according to the function that calculates the second transmission characteristic under the predetermined usage condition, the function being in the device.

10. The transmission apparatus according to claim 1, wherein the device is configured to
    manage, for each power supply voltage on which the transmission apparatus is used, a third transmission characteristic related to a usage condition at the respective power supply voltage, and obtain a power supply voltage for the transmission apparatus, and
    obtain, from the device, the third transmission characteristic corresponding to a power supply voltage at a time when the first transmission characteristic is obtained and the third transmission characteristic corresponding to a power supply voltage under the predetermined usage condition, and obtain, as the second transmission characteristic, a difference between the third transmission characteristic corresponding to the power supply voltage at the time when the first transmission characteristic is obtained and the third transmission characteristic corresponding to the power supply voltage under the predetermined usage condition.

11. The transmission apparatus according to claim 10, wherein:
the device is configured to
manage the third transmission characteristic that indicates a modulation level specific to each subcarrier included in the multi-carrier signal, within a maximum modulation level; and
correct the modulation level specific to each subcarrier within the first transmission characteristic according to the second transmission characteristic.

12. The transmission apparatus according to claim 10, wherein:
the device is configured to
manage a function that calculates the second transmission characteristic under the predetermined usage condition; and
obtain the second transmission characteristic under the predetermined usage condition according to the function that calculates the second transmission characteristic under the predetermined usage condition, the function being in the device.

13. The transmission apparatus according to claim 1, wherein the predetermined usage condition is the lowest performance environment among a plurality of performance environments within a specified performance range of the transmission apparatus.

14. The transmission apparatus according to claim 1, wherein the multi-carrier signal is a multi-carrier optical signal.

15. A transmission apparatus, comprising:
an adjuster configured to adjust a temperature in the transmission apparatus; and
a device including a processor or a circuit for executing processing functions, the device configured to
obtain a transmission characteristic in communication of a multi-carrier signal through a transmission path between the transmission apparatus and a distant transmission apparatus at a temperature that has been adjusted by the adjuster to a temperature under a predetermined usage condition within a specified performance range of the transmission apparatus, and
determine an allocation characteristic for each subcarrier included in the multi-carrier signal according to the transmission characteristic at the temperature under the predetermined usage condition, the transmission characteristic having been obtained by the device.

16. The transmission apparatus according to claim 15, wherein the multi-carrier signal is a multi-carrier optical signal.

17. A transmission method, wherein a transmission apparatus that includes a processor or a circuit for executing processing functions and transmits a multi-carrier signal to a distant transmission apparatus through a transmission path executes processing to:
obtain a first transmission characteristic in communication of the multi-carrier signal through the transmission path between the transmission apparatus and the distant transmission apparatus,
obtain a second transmission characteristic under a predetermined usage condition within a specified performance range of the transmission apparatus,
correct the first transmission characteristic according to the second transmission characteristic, and
determine an allocation characteristic for each subcarrier included in the multi-carrier signal according to the first transmission characteristic that has been corrected.

* * * * *